United States Patent
Valco et al.

(10) Patent No.: US 7,333,595 B2
(45) Date of Patent: *Feb. 19, 2008

(54) VOICE MAIL INTERFACE

(75) Inventors: Larry Lee Valco, Pleasanton, CA (US); Sherrill J. Packebush, Austin, TX (US); John Payton Beans, Oakland, CA (US)

(73) Assignee: AT&T Labs, Inc., Austin, TX (US)

( * ) Notice: Subject to any disclaimer, the term of this patent is extended or adjusted under 35 U.S.C. 154(b) by 286 days.

This patent is subject to a terminal disclaimer.

(21) Appl. No.: 10/887,837

(22) Filed: Jul. 12, 2004

(65) Prior Publication Data

US 2004/0247098 A1    Dec. 9, 2004

Related U.S. Application Data

(63) Continuation of application No. 10/166,654, filed on Jun. 12, 2002, now Pat. No. 6,826,264, which is a continuation of application No. 09/558,292, filed on Apr. 25, 2000, now Pat. No. 6,442,243.

(51) Int. Cl.
    *H04M 1/64*    (2006.01)
(52) U.S. Cl. ............................... 379/88.25; 379/88.14; 379/88.23
(58) Field of Classification Search ............. 379/88.23, 379/67.1, 88.12, 88.14, 88.22, 88.25
    See application file for complete search history.

(56) References Cited

U.S. PATENT DOCUMENTS

| | | |
|---|---|---|
| 4,757,525 A | 7/1988 | Matthews et al. |
| 5,394,445 A | 2/1995 | Ball et al. |
| 5,400,393 A | 3/1995 | Knuth |
| 5,633,917 A | 5/1997 | Rogers |
| 5,737,394 A | 4/1998 | Anderson et al. |
| 5,751,793 A | 5/1998 | Davies et al. |
| 5,797,124 A | 8/1998 | Walsh et al. |
| 5,821,936 A | 10/1998 | Shaffer et al. |
| 5,828,592 A | 10/1998 | Tran et al. |
| 5,864,605 A | 1/1999 | Keshav |
| 5,943,402 A | 8/1999 | Hamel et al. |
| 5,953,394 A | 9/1999 | Asakawa |
| 6,014,427 A | 1/2000 | Hanson et al. |
| 6,021,181 A | 2/2000 | Miner et al. |
| 6,192,112 B1 * | 2/2001 | Rapaport et al. ........ 379/88.22 |
| 6,359,970 B1 | 3/2002 | Burgess |
| 6,466,654 B1 | 10/2002 | Cooper et al. |
| 7,031,438 B1 * | 4/2006 | Cheston et al. .......... 379/88.14 |

OTHER PUBLICATIONS

Lucent Technologies, Inc., entitled "Sierra Voice Network Server", 1998.

* cited by examiner

*Primary Examiner*—Gerald Gauthier
(74) *Attorney, Agent, or Firm*—Greenblum & Bernstein, P.L.C.

(57) ABSTRACT

A method provides customized voice mail settings feature information to a telecommunications service subscriber. The method includes customizing a list of persistent settings features to include multiple persistent settings features that relate to telecommunications services subscribed to by the telecommunications service subscriber. The persistent settings features are maintained in a defined state through more than one subscriber session. The subscriber is sequentially prompted to select a persistent settings feature from the customized list by sequentially playing each of the persistent settings features to the subscriber.

20 Claims, 2 Drawing Sheets

VOICE MAIL INTERFACE

CROSS-REFERENCE TO RELATED APPLICATION

This application is a continuation of U.S. patent application Ser. No. 10/166,654, which was filed on Jun. 12, 2002 now U.S. Pat. No. 6,826,264, which was a continuation of U.S. Pat. No. 09/558,292, which was filed on Apr. 25, 2000, and which issued as U.S. Pat. No. 6,442,243, on Aug. 27, 2002, the contents of which are incorporated herein by reference in their entireties.

BACKGROUND OF THE INVENTION

1. Field of the Invention

The present invention relates to the field of telecommunications. More particularly, the present invention relates to a voice mail interface having a non-hierarchical interface structure that permits a user to access voice mail features without having to memorize commands.

2. Background Information

When a user subscribing to a voice mail service accesses a voice mail system, (for example, to listen to a recorded message), the user interacts with a voice mail interface. Typically, the user enters a password to access a voice mailbox and then enters a command (for example, presses a key on the telephone touchpad) to play a message or to enter a settings area.

Figure 1:
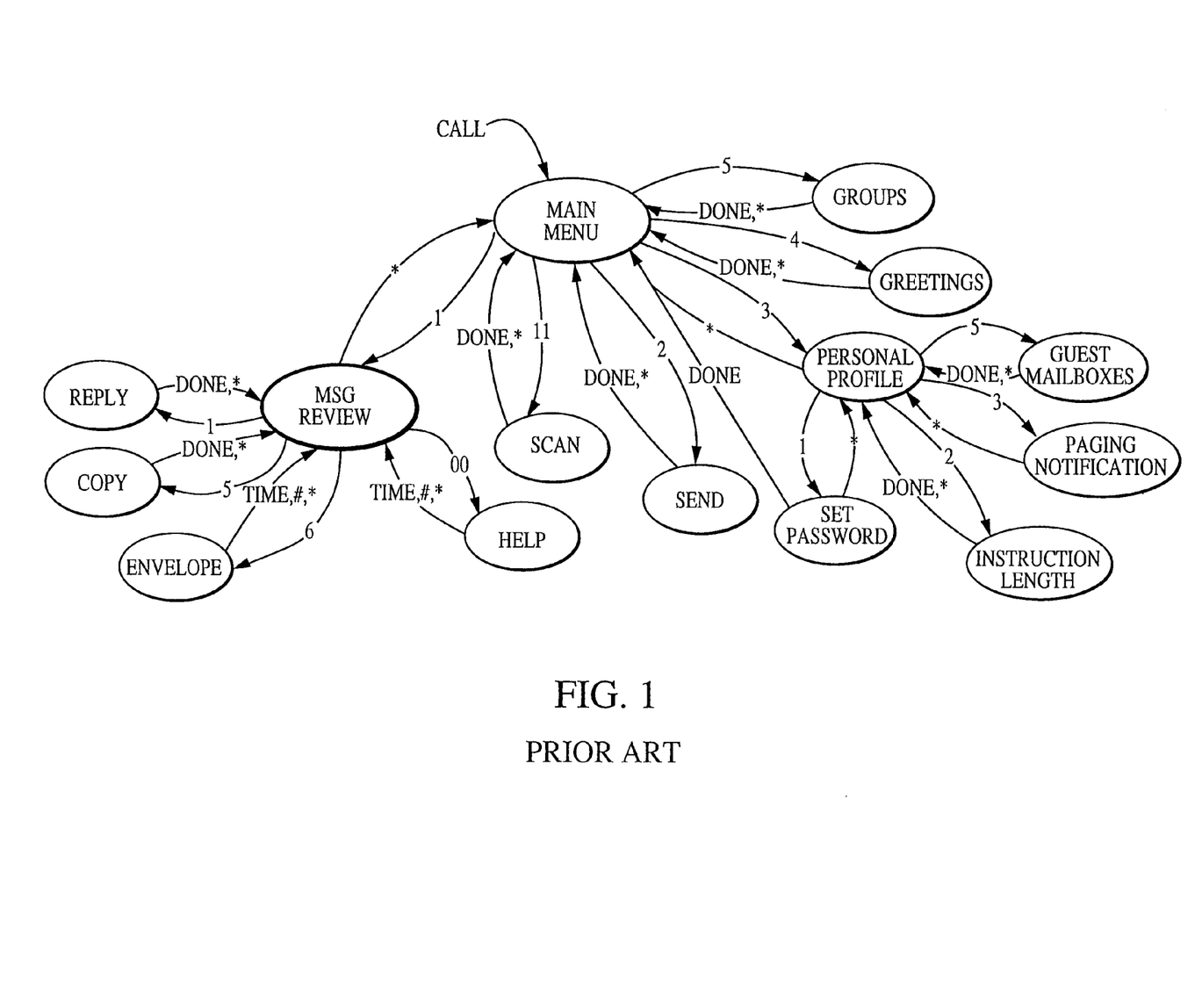
FIG. 1 shows a state diagram of a conventional voice mail interface.

Traditional settings areas rely heavily on menus. To change a setting, the user "navigates" to the appropriate area and modifies the setting. The user then "navigates" back to other functions. As seen in FIG. 1, conventional placement of functions and settings in tree-like menus requires that the user be in the right place at the right time to perform any function. For example, the user accesses a main menu after calling into the system and being validated. From the main menu, the user can access various states/settings areas by pressing 1 to review messages, 2 to send a message, 3 to access a personal profile, 4 to set greetings, 5 to access a groups function, or 11 to scan, i.e., review envelope information for all messages. To return from each state to the previous state, the user presses the * key. Thus, in order to return to the main menu from replying to a message, the user presses the * key twice, once to return to the message review area (after finishing the reply), and once to return from the message review area to the main menu.

As can be seen, users often have to go up and down the typical voice mail options tree structure to find a desired function. For example, if a user reviewing messages would like to set a password, the user must press the * key to leave message review, press the 3 key to enter the personal profile area, and finally press the 1 key to access the set password area. Similarly, the user cannot send a new message while reviewing messages. Instead the user must leave message review and return to the main menu.

Another disadvantage of conventional menu driven interfaces is that, due to the tree type structure and hierarchical nature of the options menus, many features are nested within menus and are therefore not used or understood by the majority of users. Consequently, users avoid or have trouble changing the settings of their mailboxes. Further, the tree type structure makes finding options and navigating difficult, to the point where unless the option is frequently used, it is often forgotten or thought to not exist. As a result, most users eventually learn how to change their greeting, and little else.

Conventional voice mail interfaces are also saddled with drawbacks when adding a new setting. In order to add a new setting, several decisions are required. First, the location in the decision tree must be selected. Second, how to restructure new and existing features to attempt to maintain consistency must be determined. Third, how to inform subscribers of the new setting must be decided. That is, the basic architecture of the service must be redesigned when adding new features to the service.

The Message Center, a voice mail system available from Pacific Bell Telephone Co., is a conventional menu driven voice mail program. As with all conventional voice mail interfaces, the user must develop a basic mental map before being able to easily navigate from state to state. The typical user will invent and share "shortcuts" that allow a function in one state to be immediately accessed from another state. An example is using 3-3-7 to erase a message. This shortcut spans two major program states: message listening, in which 3-3 means "go to the end" and 7 means "reduce volume"; and message disposition after the message has played, in which 7 means "erase." Notice in the midst of 3-3-7 that the 7 key changes meaning. A user must understand that just pressing 7 during a message will not erase it and that the user must first go to the menu that follows the message and then erase the message.

It is more user friendly to allow any command to be issued at any time (where practical). The Message Center and CallNotes, a voice mail system available from Southwestern Bell Telephone Co., took a step in this direction by collapsing message listening and message disposition into a single state (you can erase a message during and after a message). However, a system is still needed to take this approach further. That is, a system is desired that reduces the number of states or modes of the application, gives prominence to commonly used functions, at the expense of less-used or advanced-user functions, and is as similar as possible to the current interface.

It is known that only about ten percent of voice mail users will look at the user's manual. It is also known that calls to customer service are a significant expense. But perhaps the most expensive consequence of complex voice mail interfaces is the effect that frustration can have on customer satisfaction, retention, and word-of-mouth referrals.

Therefore, a need exists to simplify the user interface of voice mail systems. Accordingly, the present invention attempts to make every function or feature available at all times in order to reduce the amount of learning and customer support time required, and to increase day-to-day user satisfaction.

BRIEF DESCRIPTION OF THE DRAWINGS

The present invention is further described in the detailed description that follows, by reference to the noted drawings by way of non-limiting examples of preferred embodiments of the present invention, in which like reference numerals represent similar parts throughout several views of the drawings, and in which.

DETAILED DESCRIPTION OF THE PREFERRED EMBODIMENTS

In view of the foregoing, the present invention is directed to simplifying the user interface to voice mail systems. The present invention includes a flat, non-modal, non-hierarchical interface structure. Whenever possible, the amount of "navigation" required has been eliminated or kept to a minimum. That is, all options and settings or placed in a single location: the Settings Area.

An object of the present invention is to provide an easy to learn and convenient to use interface to a voice mail system. In order to achieve this object, the interface does not include a main menu, reducing navigation throughout the interface. More specifically, the user can press a predetermined key (e.g., "0") to enter a special Settings Area. Once in the Settings Area, the system presents options that the user can select. When an option is selected, the user can set the desired preference for that option. Thus, the user need only learn the predetermined key and the system will then guide the user through the process. According to another aspect of the present invention, more experienced users can press a second predetermined key (e.g., the pound key) to quickly skip to the setting the user needs. After completing the setting, the user is returned to message review. Alternatively, a third predetermined key (e.g., the star key) can cancel an action and immediately return the user to message review.

According to an aspect of the present invention, a method is provided for interfacing a subscriber to a voice mail system. The method includes immediately placing the subscriber in a message review area when the subscriber enters the voice mail system and playing messages to the subscriber. The method also includes providing multiple functions to the subscriber, which are available while the messages are playing. The method further includes placing the subscriber in a settings area in response to a subscriber's settings area command, sequentially listing a series of settings features when the subscriber is in the settings area, and changing one of the settings features in response to a subscriber's settings command. According to another aspect of the present invention, a subsequent message is played a predetermined time period after a current message finishes playing, in the event that the subscriber does not enter a command.

Sequentially listing a series of settings features also includes playing a prompt listing the title of each settings feature and, when the settings command has not been entered, playing a second prompt describing each settings feature. When the settings command has still not been entered, the first and second prompts describing the settings feature are again played, and when the settings command has still not been entered, prompts associated with a subsequent command are played.

Sequentially listing a series of settings features may also include skipping to a next settings feature when receiving a skip command from the subscriber and repeating a previous settings feature when receiving a repeat command from the subscriber. When the subscriber enters a return command during the sequential listing of settings features, the subscriber is returned to the message review area.

In one embodiment, changing one of the settings features includes immediately returning to the message review area after the settings feature has been changed. In addition, the series of settings features are listed in a prioritized order with a greetings settings feature being first. Changing one of the settings features involves sequentially listing parameters for changing the settings feature.

According to another aspect of the present invention, an interface to a voice mail system embodied on a computer readable storage medium is provided. The interface includes a message review area from where messages are played to a subscriber, and a settings area. The message review area is immediately accessed when the subscriber enters the voice mail system. The settings area is accessed from the message review area when the subscriber enters a predetermined command. Multiple settings features are sequentially accessed from the settings area; and multiple functions are directly available from the message review area. In one embodiment, the message review area plays a subsequent message a predetermined time period after a current message finishes playing, in the event that the subscriber does not enter a command.

A number of prompts associated with each settings feature are provided. A first prompt is played to identify the title of each settings feature and, when the settings command has not been entered, a second prompt is played describing the settings feature. When the settings command has still not been entered, the first and second prompts are played again, and when the settings command has still not been entered, a first prompt associated with a next command is played.

According to one embodiment, a next settings feature is skipped to upon receiving a skip command from the subscriber and a previous settings feature is repeated when receiving a repeat command from the subscriber. Furthermore, when the subscriber enters a return command, the subscriber returns to the message review area.

According to one aspect of the invention, the subscriber immediately returns to the message review area after a settings feature has been changed. The settings features also include a greetings settings feature, which is listed first and other settings features listed in a priority order. Sequentially listed parameters can also be provided for each settings feature, the parameters being for changing the settings feature.

By providing the flat interface of the present invention, new settings can be added to a list of settings and can be used immediately without special user training. The user simply presses 0 to access the Settings Area and then either waits or jumps to the new setting. Thus, the menu structure need not be redesigned whenever a new setting is added.

The present invention provides business and residential subscribers with access to many basic and advanced voice mail messaging capabilities. Subscribers can receive and review various message types, including voice mail, fax, and email. They can reply to a received message via Live Reply/Message Direct (i.e., the sender is called directly) or with a recorded message, depending upon the availability of the sender information. They can send a copy of a received message to other subscribers and non-subscribers, provided that the received message is not marked private. They can also record messages to be sent to both subscribers and non-subscribers. Through the Settings Area, subscribers can change various mailbox features and access additional functionality, including: Greeting(s), Password(s), Erased Messages, Transfer to Pager, Caller Transfer, Phone Search, Distribution Lists, Recorded Name, Time and Date Stamp, New Message Notification, Phone Number Nicknames, and Helpful Hints. Subscribers can also have extension mailboxes, with one group greeting and individual extension greetings. Other features are of course contemplated by the present invention. In terms of overall style, the prompts are brief and direct, allowing focus on the messages themselves, and making the interface feel as "light," unobtrusive, and forgiving as possible.

According to one embodiment of the present invention, when the user calls in to check messages for the first time, the voice mail system: presents a brief thanks, an introduction about what is going to happen, how long it will take, and how it can be handled by the user. The system then walks the user through steps for changing the temporary password, selecting/creating a greeting, and recording a name announcement. The system confirms each step when appropriate and offers the user the option to do it over. The system also coaches the user on each feature and setting as appropriate; and only continues to the next item when the last item has been confirmed. The voice mail system resumes initialization on the next call if the user hangs up before all of the settings have been presented at least once. Initialization resumes where the user left off, preventing the user from having to redo any previously completed portion of the initialization process. The initial call ends with a quick tip on operation and a thank you, and puts the user into the user's mailbox on that first call.

By far the most common activity for users is listening to new messages, both voice and fax. If a subscriber has multiple phone lines for one mailbox as a feature, then messages from multiple phone lines will be available for review within a single mailbox of the present invention. When the user calls to listen to messages, the messages begin playing automatically. Thus, the message review process is streamlined. Each message is numbered ("First new message, second new message"), and then the time and date that the message was received is played (unless the user has turned off the time/date feature from the Settings Area). Exemplary prompts that a user might hear upon dialing their access number include:

"You have two new messages. Message one . . . 'Hi there, it's Alan calling at around five p.m. I guess you're not home. I'll call back later.' To repeat press 1, to save press 2, to erase press 3, to reply press 4, to send a copy press 5 . . . [five seconds] . . . Message two . . . "

Notice that the password was not requested in this example. As an option, the user may request that calls from their own phone are not screened with a password. Callers from other phones, however, would still need to enter a password to obtain access. This user-settable option is referred to as Password Skip. In this example, the time/date stamp was not played prior to the message. This is another user-settable option having an on/off option.

If the user does not choose to repeat, save, erase, reply, or send a copy within about five seconds, the next message is announced and played. This "hands free" operation facilitates wireless and speaker phone review.

According to the present invention, there is no "main menu," rather messages begin playing automatically. If a user wants to send a new message, access email, or change a setting, the user may request to do so at virtually any time. Although a number of current voice mail systems have a system option to begin playing messages immediately, these systems typically retain the main menu functionality but skip over it upon mailbox access. Consequently, navigation back to the main menu is still required to send a message or change a setting.

Messages are classified as "new" or "saved." New messages are played first, then saved messages, then the cycle repeats. A message remains new until the user explicitly saves or erases it. Messages marked as urgent float to the top of each queue. Saved messages are aged off after a certain period.

Figure 2:
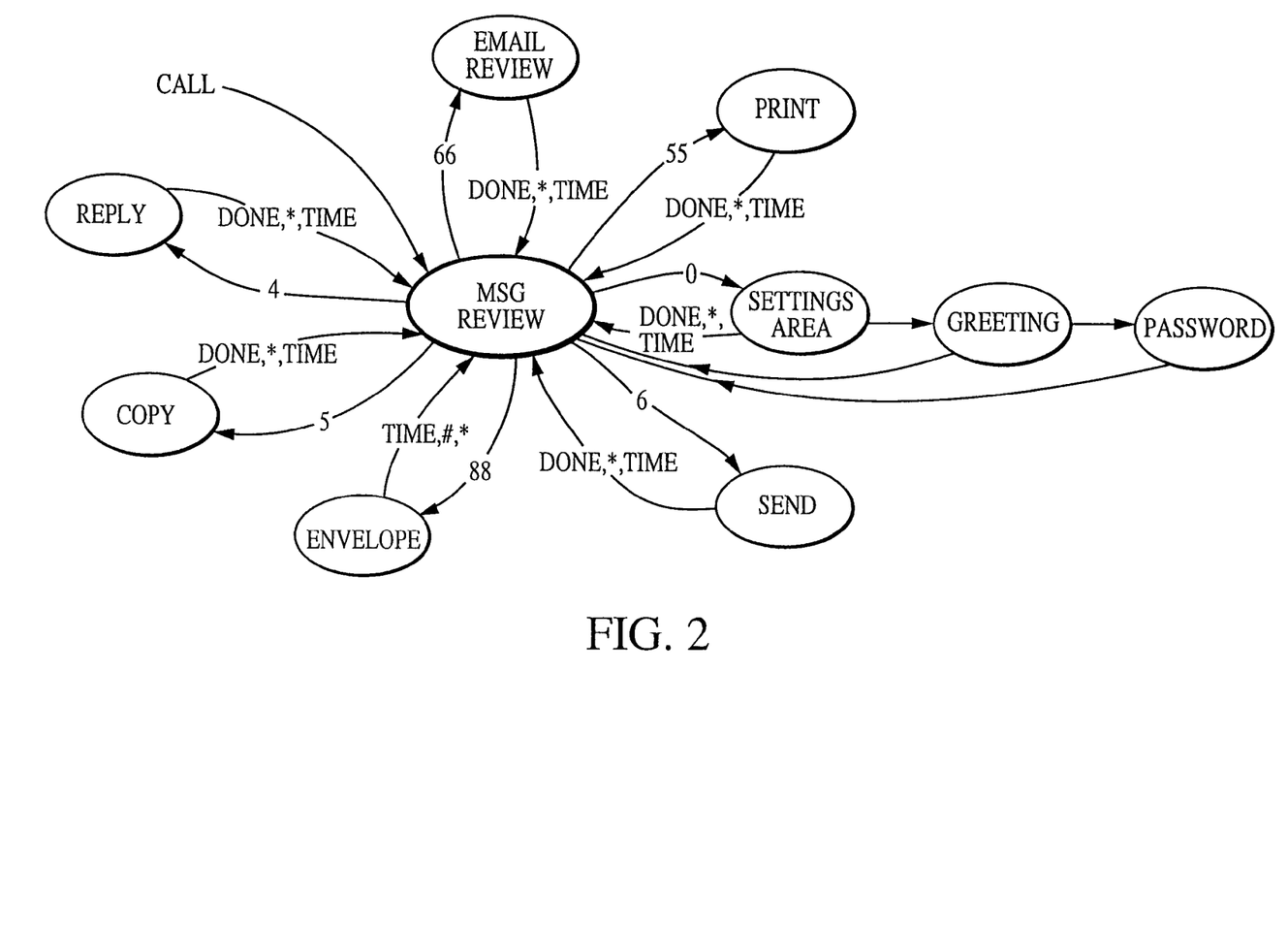
FIG. 2 shows a state diagram of a voice mail interface, in accordance with an aspect of the present invention.

According to one embodiment of the present invention, the following functions are available during message review, the most important of which are shown in FIG. 2.

| | | |
|---|---|---|
| Repeat (1) | Save (2) | Erase (3) |
| Reply (4) | Copy (5) (a.k.a. "forward") | Send new message (6) |
| Jump back in a message (7) | Pause message playing (8) | Jump ahead in message (9) |
| Jump to next queue (*) | Go to settings area (0) | Skip a message (#) |
| Go back to previous message (1-1) | | |
| Perform Quick Reply (4-4), (call a message sender directly) | Print (5-5), (if an email or fax) | Go to email (6-6) |
| Slow down a message (7-7) | Play time/date stamp (8-8) | Speed up a message (9-9) |

The user may activate each function, both during and after a message, with a single command. In most cases, a menu is played after each message that only prompts for replay, save, and erase. Reply and copy are included when applicable and print is included if the message is a fax or email.

After successfully executing "modal" commands, i.e., commands unique to an area, such as reply, copy, send, check time/date, or enter Settings Area, the user is returned to the end of the current message. If a message is skipped, saved, or erased, the system moves to the next message. The user can, however, return to the previous message at any time. If the user does not enter a command within several seconds from the playing of the "after message" menu, the system moves to the next message.

Some branching or "modality" (the condition of being constrained to the task at hand) cannot be eliminated. As seen in FIG. 2, which shows the primary modes of the current design, the user is immediately placed in message review. From message review the other major states are all available.

According to an aspect of the present invention, inactivity on the users' part is a valid input, and should gracefully allow hands-free usage and exit from any functional modes in an appropriate manner (e.g., when listening to emails or changing a setting, "doing nothing" will eventually lead the user back to voice messages). In addition, double keystrokes cannot be relied on for mainstream usage, and are reserved for advanced features only. To prevent a late command, e.g., a late press of the 3 key, from erasing the following message, which is automatically played after the previous message, the erase command is applied to the previous message during the first 0.5 seconds of the next message's number prompt. Other delay periods can be set based upon need.

Individual features available in an exemplary implementation of the present invention are now discussed. A reply feature, if reply information is available, can be provided and will cause the system to ask the user if he wishes to reply to the message without entering the sender's phone number. When pressing the reply command, the user will be prompted to record a message or to place a call directly back to the message originator. For sending a recorded message, after pressing the pound key to complete the message, options for review and delivery are presented. Upon pressing the pound key to deliver the message, the message is sent with a "reply sent" prompt. If a call is placed directly to the message originator, the user can return to their voice messages at any time by pressing the pound key twice, or when the called party disconnects.

When a copy feature (allowing users to transfer received messages) is selected, the system asks the user to address the message to one or more recipients, or a distribution list. When the user has programmed at least one distribution list, the addressing prompt changes to reflect this option. Distribution lists allow a user to enter phone numbers for a group of people. When the user decides to send, copy, or reply, to the group, the user can address the message to the distribution list rather than having to enter all of the recipients' phone numbers. The system places no minimum duration on the recorded introduction that the user is asked to record allowing, in effect, no introduction if desired. After pressing the pound key to complete the message, options for review and delivery are presented. Upon pressing the pound key to deliver the message, the message is sent with a "copy sent" prompt. The recipient of the message hears a single time/date stamp that reflects the time the message was received.

When a send feature is selected, the system asks the user to address the message to one or more recipients, or a distribution list. When the user has programmed at least one distribution list, the addressing prompt changes to reflect this option. According to one embodiment of the present invention, the message must be at least two seconds long. After pressing the pound key to complete the message, options for review and delivery are presented. Upon pressing the pound key to deliver the message, the message is sent with a "message sent" prompt. When replay is selected, the system repeats the message that was just played.

The system should be as forgiving and helpful as possible during address entry. To do this, the system is designed to: recognize valid numbers without a pound key; recognize abbreviations of valid numbers; allow plenty of time to dial numbers; and allow entry of any number up to eleven digits long (if necessary, an extension is subsequently prompted, so it can be typed along with the number).

The logic and timeouts used during address entry will now be discussed. In order to end an address, the system assumes that entry is complete when one of three things happens: the pound key is depressed, the star key is depressed, or a time out occurs. As each digit is entered, the system evaluates the validity of the entry. The system will classify the numbers entered so far into one of three categories. The first category is VALID, occurring when 7 or 10 digits are recognized as a subscriber, or 11 digits are entered. The second category is MIGHT BE VALID, occurring when: 1 to 5 digits correspond to a entry in a personal distribution list; 1 to 5 digits correspond to a valid extension; 7 digits are entered and 1 to 3 digits are not a recognized area code; or 5 digits have been entered and digit 1 is digit 3 of the subscriber's NXX. The numbers are classified as NOT VALID in all other cases.

To achieve the desired behavior, three different timeout criteria are used, depending on the status of the numbers entered so far. A three second timeout period is set when a VALID number is entered. A seven second timeout is set when a MIGHT BE VALID number is entered. A fifteen second timeout period is set for all other cases.

Some example situations using the above rules and timeouts will now be discussed. One to five digits not recognized as an extension or a list will time out after fifteen seconds. One to five digits recognized as an extension or a list will time out after seven seconds. Five digits that start with digit three of the subscriber's NXX will time out after seven seconds. Seven digits recognized as a subscriber will time out after three seconds. Seven digits not recognized as a subscriber will time out after seven seconds (as long as digits one to three are not an area code).

If Message Delivery to Non-subscribers (MDNS) has been activated, an added set of prompts appear during addressing. Message Delivery to Non-subscribers allows messages to be sent to people who are not subscribers to the voice mail system, by ringing their phones and delivering the messages when the phones are answered. When the user requests delivery to a non-subscriber number, if charges will be applied (either per minute or per message) the user is notified of this fact. In addition, the system notifies the user that this message will be delivered to a non-subscriber, and will be returned if delivery is not possible. If the number is a valid subscriber, the above two steps are not executed.

According to an aspect of the present invention, recording stops when a pound key, a star key, or a time out occurs. Three different timeout criteria are used, depending on the status of the recording. The time outs are designed to provide adequate time to continue input without being so long that subscribers become frustrated. A period of three seconds is set after initial silence (e.g., silence after a record tone), after entering a recognized digit or number, or after entering a single digit that is not valid. A periods of seven seconds is set when there is silence after sound (e.g., after recording a message or greeting) or after entering a number of the expected length that is not valid. A period of fifteen seconds is set after entering a number of unexpected length. An exemplary total recording time is 120 seconds.

Example situations using the above rules and timeouts follow. A beep tone followed by three seconds of silence re-prompts the user to begin recording after the tone. If the user records a message and then says nothing for seven seconds, the system acts as if the message was then terminated by the pound key. If the total time allowed for the recording is exceeded (in this example 120 seconds), the user is informed and prompted to accept or re-record. If the user presses the star key during the first two seconds, the entire action (sending, replying, etc.) is canceled. If the user presses the star key after the first two seconds, the user is prompted to re-record.

The present invention was developed in response to the fact that users typically change one setting at a time, and the greeting is by far the most often changed setting. The present invention also respond to the facts that users cannot be expected to memorize a different procedure for changing each setting; and settings not very easily found are not changed, sometimes preventing features of the mailbox from being used. The present invention also is flexible enough so that more features (and thus settings) can be added in the future, and different configurations of the product can have different sets of settings.

The present invention does not require "navigation" to and from features. Rather, several basic design philosophies are adhered to whenever practical in the Settings Area. For example, according to an aspect of the present invention, menus do not lead to other menus, i.e., menus are only used for the setting itself, not to get to the setting. According to another aspect, lists are treated as lists that the user can review from top to bottom. That is, lists have no arbitrary limit on the number of items (which would be the case if each list item was a choice in a menu). Furthermore, the presence or absence of a setting does not effect the structure of the Settings Area.

The new design gives the user a simple instruction for changing their greeting or any other setting: "Press the [0] key." From that point on the user is guided through and instructed about the meaning and procedure for changing each setting.

According to an embodiment of the present invention, the system acknowledges that the user has pressed 0 to enter the Settings Area. Subsequently, the system gives a very brief set of instructions: e.g., "Press pound until you hear the item that you want, then press zero to change it." In this embodiment, the system uses the bottom row of keys as user controls: the user may press the pound key to skip to the next setting, 0 to change a setting, and the star key to leave the settings area.

Moreover, the system returns the user to their messages after changing a setting (it assumes that user wanted to change just one setting). The system leads the user from option to option if the user does not make a choice; if the user does nothing the user will hear each setting twice and listen to a clear description of what each setting does. That is, the system coaches/assists the user by playing a description of that setting when the user does not react to the setting. Finally, the system places the greeting at the very top of the settings area (so, a shortcut to changing the greeting is to press 0-0) and places other settings in order of importance and frequency of use.

There may be special exceptions to this approach. For instance, after entering the Settings Area the user should not have to press 0 to change the native language of the mailbox. This is because when using the mailbox with an unfamiliar language, it is difficult or impossible to figure out how to revert to the user's native language. For instance, if Mandarin Chinese had been selected and the user speaks English, the user should be able to hit 0 to enter the Settings Area and wait until "For English press [1]" is heard. This situation supports the present invention's "auto-roll" behavior in the Settings Area, where the mailbox moves to the next setting eventually if no key is pressed.

An embodiment of a Settings Area will now be described. Settings are presented sequentially, one after another, not as branches in a menu tree. Moreover, within each setting, parameters are also presented one at a time. As a result of this sequential approach, the user must listen through or skip through all of the items prior to the item desired to be changed or added. In addition, the user is "led through" the changes, and has few decisions to make other than the choices for the settings themselves. Such an arrangement provides the advantage that, if it is determined at a later time that the order of settings should be changed, the order can be easily changed. According to another aspect, each setting is confirmed at the time it is entered or changed. Consequently, an enhanced feeling of control and certainty is gained.

When a list (e.g., phone numbers in a distribution list) is being edited, existing items are accepted, edited, or removed first. Then new items may be entered. Consequently, inserting an item between two existing items in an order-sensitive list can be laborious because the user must listen to or skip ahead to the insertion position and all subsequent items must be edited (or erased and reentered). Fortunately, no significant adverse impact of this approach has been identified because distribution lists are the only lists of significant size, and they are not order-sensitive. On the other hand, no memorization of list items or the location of list items is required to modify them, easing enhancement of the list (i.e., changing a specific distribution list does not require the entry of the distribution number first, although a user can do so and go directly to the desired distribution list).

Table 1 shows exemplary key conventions within the Settings Area, which provide for consistency and "availability."

TABLE 1

| 1 | On/off or return messages | |
|---|---|---|
| 1.1 | Keep on/off | # |
| 1.2 | Change to on/off | 0 |
| 1.3 | Leave the Setting Area | * |
| 2 | Skip, change, or return to messages | |
| 2.1 | Skip | # |
| 2.2 | Change | 0 |
| 2.3 | Return to messages | * |
| 3 | For lists: keep, change, or remove, return to messages | |
| 3.1 | Keep | # |
| 3.2 | Change | 0 |
| 3.3 | Remove | 3 |
| 3.4 | Leave the Settings Area | * |
| 4 | Entering a number | number + # |
| 5 | No more numbers to enter | (just) # |
| 6 | Canceling a partial recording or entry | (talk or digits) * |
| 7 | Canceling recording or entry and returning to messages | (just) * |
| 8 | Roll to next setting or item | timeout |

The settings appear in order of frequency of usage, so that more frequently accessed settings require as few as possible steps. In an embodiment of the present invention the list of settings/options (in order of appearance) includes:

1. Greeting(s)—Group and extension or just single line greeting, with options to use a system greeting or alternate recorded greeting, for each phone line when multiple lines are connected to a single mailbox
2. Change Password/Password Skip
3. Erased Message queue
4. Reminder Messages
5. Distribution Lists
6. Helpful Hints—includes help topics on the pound key; changing greetings; features that make listening to messages faster; replying, copying, and sending messages; email review; and advanced call management features
7. Time/date stamp on/off
8. Transfer to Pager
9. Transfer to Attendant/Caller Transfer
10. Phone Search
11. New Message Notifications
12. Outcall Notification
13. Recorded Name
14. Phone Number Nickname—allows subscribers to record a brief descriptive label for each phone line (when multiple lines are connected to a single mailbox), to be played as part of each message header
15. Extension number This list "loops," so that Greeting(s) follows Extension Number. The Previous command (1-1) works in the settings area as expected. Note that only settings that apply will be presented. For example, if the subscriber does not have email, then no email Helpful Hint will be presented. Another example is if the subscriber does not have multiple phone lines assigned to one mailbox, then Phone Number Nickname will not be presented and the Greetings setting will not include multiple phone line greetings.

From session to session, a queue of the most recently erased messages is kept in the Settings Area. These age off after a certain time period, and the queue size may be limited so that newly erased messages "bump" the oldest ones out of the queue. Unlike every other queue, erased messages are presented in reverse chronological order, so that the most recently erased messages appear first. Controls within the erased message queue work identically to the new and saved message queues, but like email the star key allows the user to return to the main voice and fax queues. All functions are available, including reply, copy, send, and save.

If a user accidentally erases a message, the message can still be retrieved and acted upon. The erased message queue is explicitly mentioned within the Additional Options and is conspicuous within the Settings Area (the third setting).

After hearing or skipping the last message, subscribers are explicitly prompted with a set of Additional Options that list the Send, Email (when available), and Settings Area options, and to hang up if the subscriber is finished. Within this prompt, the Change Greeting setting and Erased Messages are mentioned with respect to the Settings Area. An exemplary prompt states:

"End of messages. To record a message to be sent to another subscriber, press 6. To review your email, press 8. To change something about your mailbox, such as your greeting or to review your erased messages, press 0. If you have finished listening to your messages, you may hang up."

This feature allows subscribers to automatically hear their messages and options without having to press a key. Instead, a time out after message review options, Additional Options (Send, Email, Settings), or after a setting, will move the user to the next message, set of options (after two time outs), or help/coaching prompt (Settings Area).

According to an aspect of the present invention, subscribers go through a typical initialization process the first time they call their voice mail service, including changing the temporary password, selecting/creating a greeting, and recording a name announcement. Subscribers having multiple phone lines connected to a single mailbox will also record separate greetings for each phone line. For those subscribers with extension mailboxes, the subscriber will select an extension mailbox number, change the temporary password, record the extension greeting, record the extension name recording, and then change/record the group greeting. This process varies slightly if the particular extension mailbox is a mailbox having multiple lines, such that each phone line greeting and name recording is set up before the group greeting.

Once initialization is completed and messages are received, subscribers will first access any new voice and fax messages. Subscribers can choose to bypass the new messages by pressing the star key at any time. If they do not press the star key, the new voice and fax messages will begin autoplaying according to priority (e.g., urgent messages first) and order of arrival. At any time subscribers can skip individual messages by pressing the pound key. During or immediately after message playback (when the message options are explicitly presented), the subscriber can choose to do the following: replay the message by pressing 1; back up to a previous message by pressing 1-1; save the message by pressing 2; erase the message by pressing 3; reply with a recorded message, by pressing 4 (if recipient information available), to a distribution list, to another subscriber(s) for mailbox delivery, or to a non-subscriber(s) for delivery to that person's telephone; perform a Live Reply/Message Direct where the sender is called directly by pressing 4-4; send a copy by pressing 5, to a distribution list, to another subscriber(s) for mailbox delivery, or to a non-subscriber(s) for delivery to that person's telephone; or if the message is a fax, print a copy of the fax by pressing 5-5.

During message playback, subscribers can also: rewind by pressing 7; slow down message playing by pressing 7-7; pause by pressing 8; receive time and date (and if applicable, phone number nickname) information by pressing 8-8; fast forward by pressing 9; or speed up message playing by pressing 9-9. Once the subscriber has either heard all new messages or skipped past them, any saved messages are autoplayed. Subscribers have the same options during saved message playback as they do during new message playback.

At any time, whether messages are being played or not, subscribers can: send a message by pressing 6, to a distribution list, to another subscriber(s) for mailbox delivery, or to a non-subscriber(s) for delivery to that person's telephone; access email by pressing 6-6; or access the Settings Area by pressing 0. Sent, recorded reply, and copied messages may also be marked urgent or private. Subscribers also have the capability to review and record the message or introduction.

If a subscriber presses 6-6 to access email, the new and saved email messages have essentially the same order of presentation and functionality as the other message types. Email messages are autoplayed via text to speech. They can be printed by pressing 5-5. Reply and copy functionality are also possible, e.g., by sending a .wav file to the email sender. Once the last email message is played, timing out will return the subscriber to the voice/fax new or saved message queues, depending upon the existence of messages and where the subscriber was when first entering email review. Pressing the star key at any time will also return the subscriber to the voice/fax new or saved message queues.

Once a subscriber presses 0 to enter the Settings Area, the subscriber can move to each setting by pressing the pound key or return to a previous setting by pressing 1-1. Pressing the star key at any time will return the subscriber to the voice/fax new or saved message queues, depending upon the existence of messages and where the subscriber was when first entering the Settings Area. Subscribers are presented with the name for a setting. If the subscriber does not immediately press a key, then the prompt continues with information describing the particular setting. If the subscriber still does not press a key, then the setting title and information will be repeated again. If the subscriber still does not press a key, then the title for the next setting will be played, and so on. Subscribers can access the setting that is being prompted by pressing zero at any time. After pressing zero to enter a setting, various instructions are presented. Once the subscriber completes the desired actions for a setting or presses the star key, the subscriber will be returned to the voice/fax new or saved message queues, depending upon the existence of messages and where the subscriber was when first entering the Settings Area.

Subscribers end their voice mail session at any time by hanging up. This instruction is presented at the end of the message queues, along with the instructions for sending messages and accessing email.

Callers who reach the voice mail system of the present invention will not necessarily know whether they have reached a voice mail service or an answering machine. They will hear either the subscriber's recorded greeting or a system standard greeting, depending upon what greeting the subscriber has selected and which phone line was called. If the called subscriber has extension mailboxes, the caller will first hear the group greeting and depending upon what extension number is pressed, then the appropriate extension greeting. During the greeting and the recording of a message, bad key sequences invoke a polite error prompt and cause the greeting to be replayed. Once a caller leaves a voice message, if the caller knows to press the pound key, the caller will have the option to review the message, to re-record the message, to mark it urgent, or to mark it private.

An advantage of the present invention is that there is minimal keystroke duplication and consistent key assignment. More particularly, there are no hierarchical menu layers and therefore the majority of key assignments stay the same the majority of the time. Consistently, the pound key moves to the next step/option or terminates entry, the star key cancels or moves to a previous queue, and the zero key accesses the Settings Area and enables changes.

Another advantage of the present invention is that minimal steps and number entry are required. Because of the non-hierarchical structure, frequently performed options require a minimal number of steps. The service also suggests appropriate phone numbers rather than requiring subscribers to reenter phone numbers (e.g., the service suggests the last fax number printed to, states the phone numbers in Greetings by Telephone Number, etc.), reducing the need to enter seven or ten digit numbers.

The present invention also provides the ability to act with no main menu. Because there is no Main Menu, subscribers can act to send a message, retrieve Email, or access the Settings Area at any point while reviewing messages. This eliminates the need to be in or navigate to a specific menu in order to do specific things.

According to another aspect of the present invention, after entering a string of numbers or making a recording, subscribers can terminate by pressing the pound key or by letting time out move them to the next step. The pound key is not required, even though it is sometimes requested in a preceding prompt.

Another advantage of the present invention is that the flat structure of the Settings Area explicitly presents all features by prompting one after the other. The flat Settings Area makes the settings features more conspicuous, unlike hierarchical structures in which features are often hidden in lower menus. Also, options are explicitly prompted and therefore not hidden from subscribers.

The Settings Area presents the most frequently used and important settings first, e.g., Greeting, Passcode (Change and Home No Password), Erased Message Queue, etc. This minimizes the number of times the pound key must be pressed to reach the more common settings.

Because of the flat structure and minimal key assignments, documentation will be simple and uncluttered. Instructions should be easily transferable to Quick Reference Cards. In addition, because the Settings Area is flat, settings can simply be listed without the need to show paths and menus. Because key assignments rarely change, the telephone keypad can be shown with the main key assignments.

All prompts are interruptible and will accept data entry before playing is complete. If a user accidentally presses the wrong key or decides not to complete a process, the user can interrupt the subsequent prompt and/or cancel with the star key, returning to the previous step or area.

According to one embodiment of the present invention, the present invention operates on a Unisys mainframe computer employing application software release UVMS 12.5, NAP 17.8, MCP 4.61. An exemplary service creation environment is Unisys NapTool 15.1. Although the Unisys platform is discussed, any platform/system have appropriate functionality may be substituted.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

The present invention also contemplates including new features and functionality, such as features available with The Message Center that are not currently in the design. They may also include new features such as Reminders, Future Delivery, Email Reply, Email Copy, and changing the subscriber's Ring Cycle. Finally, expansion to a Unified Messaging service <i.e., access from a personal computer, is contemplated, as is accommodating voice recognition.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. Accordingly, the invention is considered to include a tangible storage medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards represents examples of the state of the art. Such standards are periodically superseded by faster or more efficient equivalents having essentially the same functions. Accordingly, replacement standards and protocols having the same functions are considered equivalents.

What is claimed is:

1. A method for providing customized voice mail settings feature information of at least one telecommunications service, the method comprising:
   customizing a list of persistent settings features to include a plurality of persistent settings features that relate to subscribed telecommunications services, the persistent settings features being maintained in a defined state through more than one user session; and
   sequentially prompting a user to select a persistent settings feature from the customized list by sequentially playing each of the persistent settings features.

2. The method of claim 1, further comprising:
   playing voicemail messages when the user is in a voicemail message review area after accessing a voicemail service to initiate a voicemail session; and
   providing at least one function to the user, the at least one function being available while the voicemail messages are playing and including an option of accessing a settings area to review the sequential prompts in response to a command to access the settings area.

3. The method of claim 2, in which the sequentially prompting is performed in response to the command to access the settings area; and
in which the playing voicemail messages is again performed in response to a command to return to the voicemail message review area.

4. The method of claim 1, in which the persistent settings features are listed in a priority order.

5. The method of claim 4, in which the order of priority of the persistent settings features in the persistent settings features list is based upon a frequency of selection.

6. The method of claim 1, further comprising adding new persistent settings features to the customized list when new telecommunications services corresponding to the new persistent settings features are subscribed to.

7. The method of claim 1, further comprising removing persistent settings features from the customized list when telecommunications services corresponding to the persistent settings features are canceled.

8. The method of claim 1, further comprising:
in response to a selection of a persistent settings feature, sequentially prompting the user to review a parameter of the selected persistent settings feature.

9. The method of claim 8, further comprising:
resetting the selected persistent settings feature parameter based upon input from the user.

10. The method of claim 2, in which at least one input can be used at any time during the voicemail session to perform the same function.

11. A tangible computer readable medium for storing a computer program, executable by a computer, that provides customized voice mail settings feature information regarding a telecommunications service, the medium comprising:
customizing code for customizing a list of persistent settings features to include a plurality of persistent settings features that relate to telecommunications services;
persistent settings features status code for maintaining the persistent settings features in a defined state through more than one user session; and
feature-based prompting code for sequentially prompting the user to select a persistent settings feature from the customized list by sequentially playing each of the persistent settings features to the user.

12. The tangible computer readable medium of claim 11, further comprising:
voicemail playing code for playing voicemail messages to the user in a voicemail message review area after accessing a voicemail service to initiate a voicemail session; and
function providing code for providing at least one function to the user, the functions being available while the voicemail messages are playing and including an option of accessing a settings area to review the sequential prompts in response to a command to access the settings area.

13. The tangible computer readable medium of claim 12, in which the feature-based prompting code is configured to sequentially prompt the user in response to the command to access the settings area; and
in which the voicemail playing code is configured to again play voicemail messages in response to a command to return to the voicemail message review area.

14. The tangible computer readable medium of claim 12, in which the function providing code is configured to accept at least one input at any time during the voicemail session to perform the same function.

15. The tangible computer readable medium of claim 11, in which the persistent settings features are listed in a priority order.

16. The tangible computer readable medium of claim 15, in which the order of priority of the persistent settings features in the persistent settings features list is based upon a frequency of selection.

17. The tangible computer readable medium of claim 11, further comprising:
new features adding code for adding new persistent settings features to the customized list when new telecommunications services, corresponding to the new persistent settings features, are subscribed to.

18. The tangible computer readable medium of claim 11, further comprising:
cancelled features removing code for removing persistent settings features from the customized list when telecommunications services, corresponding to the persistent settings features to be removed, are cancelled.

19. The tangible computer readable medium of claim 11, further comprising:
parameter-based prompting code for sequentially prompting the user to review a parameter of a persistent settings feature that is selected.

20. The tangible computer readable medium of claim 19, further comprising:
parameter resetting code for resetting the persistent settings feature parameter based upon input from the user.

* * * * *